June 22, 1965     D. A. MOORE     3,190,944
METHOD OF MOLD TEMPERATURE CONTROL
Filed May 31, 1963     2 Sheets-Sheet 1

INVENTOR.
DONALD A. MOORE
BY
Russell, Chittick & Pfund
ATTORNEYS

June 22, 1965 D. A. MOORE 3,190,944
METHOD OF MOLD TEMPERATURE CONTROL
Filed May 31, 1963 2 Sheets-Sheet 2

INVENTOR.
DONALD A. MOORE
BY
*Russell, Chittick & Pfund*
ATTORNEYS

United States Patent Office 3,190,944
Patented June 22, 1965

3,190,944
METHOD OF MOLD TEMPERATURE CONTROL
Donald A. Moore, New Castle, N.H., assignor, by mesne assignments, to Davidson Rubber Company, Incorporated, a corporation of Delaware
Filed May 31, 1963, Ser. No. 284,620
2 Claims. (Cl. 264—45)

This invention relates to a method for controlling the temperature levels in mold walls and more particularly to a control system and method of employment thereof which utilizes several reservoirs of oil maintained at different temperatures wherein the oil is fed through multiple spray nozzles against the walls of a mold to rapidly change the wall temperature characteristics.

In the past, interior door panels for automobiles have usually been constructed by stapling a thin sheet of plastic material onto a backing board, attaching an arm rest to the board and cutting holes in the panel through which window and door operating handles can protrude. In more lavishly appointed luxury automobiles, however, it has been found desirable to construct the interior door panels in a manner such that the arm rest is formed as an integral portion of the panel and is fitted with recesses for an ashtray, window controls and a door opening latch. Also, automobile purchasers have shown a preference for interior door panels which have a plush cushiony leather-like feel that is obtained by placing a foamed plastic cushion behind the thin plastic skin. The general practice in the industry, to achieve this cushioned integrated door panel, has been to vacuum form sheets of a acrylonitrile-butadiene-styrene (ABS) resin to the desired shape, cushion it with a pad of foamed resin such as polyurethane and affix it to a backing board. This process yields a satisfactory product in a short period of time, but has a serious drawback in the fact that the ABS sheet stock is quite expensive when compared to other plastic sheet materials such as plastisol.

To overcome this cost problem, as well as other related problems, a new method of manufacturing upholstery units such as door panels has been invented and is the subject of a pending patent application by Roland Gagnon, Ser. No. 269,455, filed April 1, 1963, and assigned to the assignee of this application. Gagnon's method produces a panel having a surface layer composed of a tough, but flexible skin of solid vinyl plastisol film fused to a sublayer of foamed vinyl plastisol within which a core of resilient urethane foam is positioned.

To be more specific, Gagnon's process consists of the following steps.

(1) Preheat the mold to a gelling temperature of 225°–300° F.

(2) Apply non-expandable vinyl plastisol to the mold and allow to gel to a 8–20 mils thick skin.

(3) Apply an approximately equal amount of expansible vinyl plastisol and allow to gel.

(4) Heat mold to a blowing and fusing temperature of at least 150° F. above gelling temperature.

(5) Cool mold to at least 100° F. below gelling temperature and strip shell from mold.

(6) Place shell in a second mold strong enough to withstand urethane foaming conditions.

(7) Inject metered amount of foamable urethane, close mold and allow to foam and cure.

(8) Open mold and remove completed unit, e.g. automotive door panel.

The subject matter of my present invention is the method of heating and cooling a mold such as the mold used in the Gagnon process. More particularly, it is the use of a system having multiple reservoirs containing heated and cooled fluids which are connected, by means of pumps and valves, to spray nozzles positioned beneath the mold, a system which can be operated in such a way that the mold walls can be heated and cooled in conformance with a predetermined time and temperature schedule.

It is therefore one of the objects of this invention to employ a temperature control system for molds having several oil tanks and a multiplicity of spray nozzles disposed beneath a mold whereby the heated or cooled oil can be sprayed onto the bottom of the mold to rapidly change the temperature thereof.

Another object of this invention is to employ a temperature control system for molds which will be fast acting and thereby cause production of a door panel to require a minimum length of time.

A still further object of this invention is to employ a temperature control system for molds utilizing apparatus which is simple to operate and requires a minmimum of attention so that it can be used in conjunction with the other molding equipment whereby one man can perform all the operations necessary to mold a door panel.

It is yet another object of this invention to employ a temperature control system for molds which is designed and constructed to instantaneously control the wall temperatures of a mold.

Other objects and advantages of my invention will become apparent from a study of the accompanying drawings and descriptive matter in which is illustrated and described a preferred embodiment of the invention.

Figure 1:
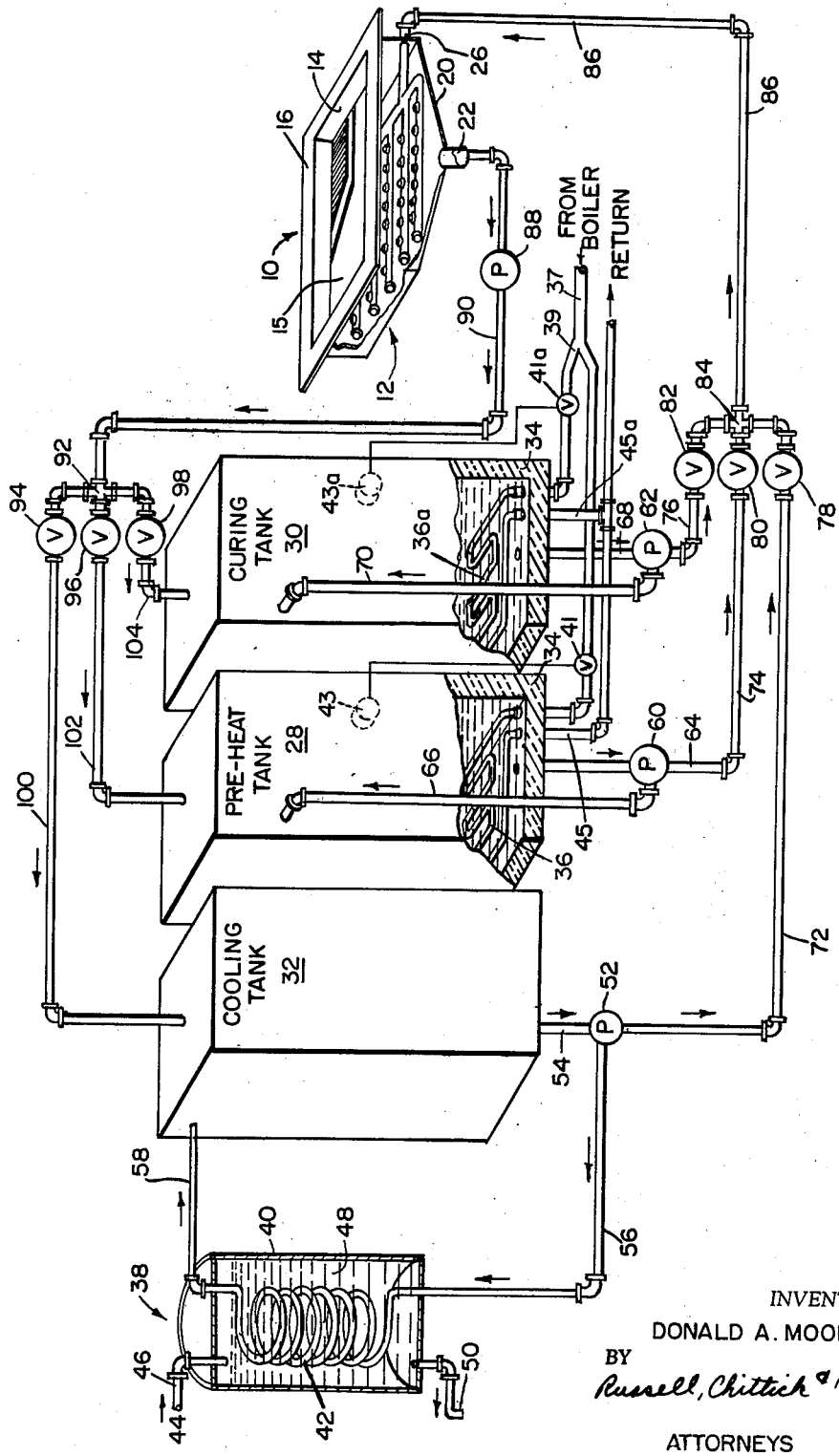
FIG. 1 is a view in perspective of the temperature control system for molds incorporating the invention and illustrating the oil tanks, pipe lines, pumps and valves, and the mold, beneath which is positioned a multiplicity of spray nozzles.

Referring now more particularly to the drawings, a preferred embodiment of the temperature control system for molds is shown in FIG. 1. Specifically, the mold is generally designated as 10 and is a box-like container resting upon an oil discharge pan, generally designated as 12, without being fixed thereto. The mold 10 is a concave mold having thin side walls 14, a bottom 15 and a horizontal support flange 16 all made of copper or other material having good heat conductivity characteristics. This is an important requirement where the materials to be molded have short reaction times. As illustrated, the upwardly facing mold bears on its surface the design to be produced in the outer surface of the molded article.

Figure 3:
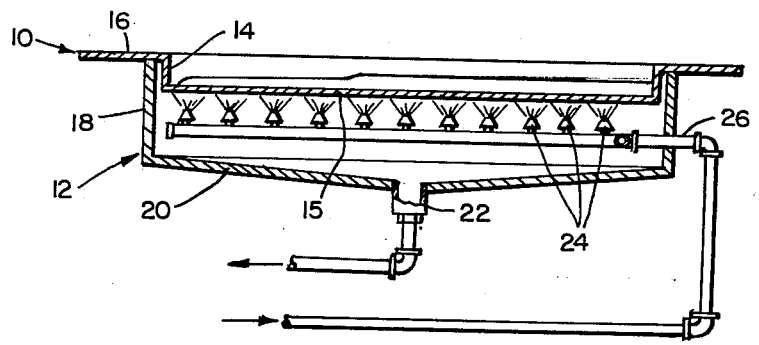
FIG. 3 is a view in section taken along lines 3—3 of FIG. 2 and shows the oil pan interior and the mold with the upstanding spray nozzles immediately beneath.

Referring more particularly to FIG. 3, the oil discharge pan 12 has vertical walls 18 which abut and support the underside of the peripheral mold support flange 16 without a rigid connection existing therebetween. Sloping pan floor 20 has a discharge drain 22 fitted at its lowest point.

Positioned within oil discharge pan 12 directly beneath mold 10 is a multiplicity of spray nozzles 24, preferably 25 to 50 in number depending on the size of the mold, which are branch connected to an inlet line 26. The nozzles are arranged in a geometric pattern designed to uniformly spray the entire exterior area of the mold.

It can thus be seen that oil can be sprayed through nozzles 24 against the mold bottom 15, collected in discharge pan 12 and discharged through drain 22.

Figure 2:
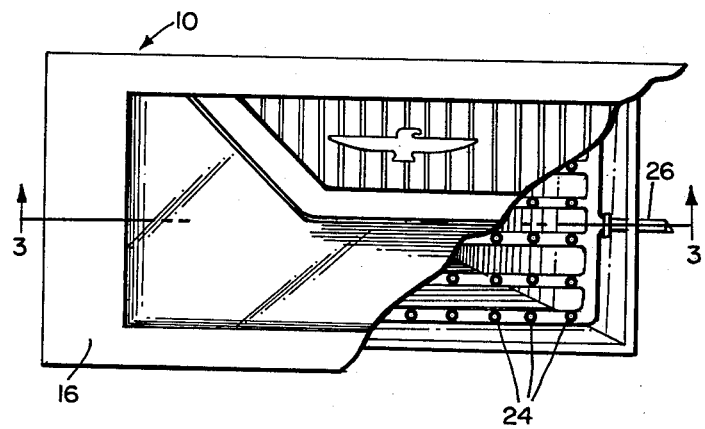
FIG. 2 is a top plan view of the mold, partly cut away, showing the mold design and the underlying spray nozzles.

Referring again to FIGS. 2 and 3, it will be appreciated that in a process such as Gagnon's aforementioned method of producing molded door panels, there are three temperature levels at which the mold must be sequentially maintained during the production cycle. These temperature levels must be rapidly established and then rigidly held for a precise length of time. To be more specific, in Gagnon's process the mold is first preheated to gelation temperature of approximately 250° F. (using the described ingredients). After the vinyl sheet and vinyl foam coats are applied and gelled, the mold is heated to the fusion temperature of approximately 425° F. Lastly, the mold is cooled to approximately 100° after which the fused vinyl shell is removed from the mold.

To accomplish these wide temperature changes as rapidly as possible, it has been found that the use of multiple spray nozzles which are pump fed from tanks containing hot and cold oil is a method to be preferred to a fluid jacket approach similar to that used in an automobile cooling system. A major advantage of the spray system over an oil jacket approach for mold temperature control is that in the spray system the oil that is showered against the mold can be instantly changed from one temperature to another whereas in the jacketed system a complete drainage is required before the system can be refilled with a fluid having a different temperature. The spray nozzles therefore facilitate more accurate time cycling and help to prevent over or under gelling and curing. Furthermore, the spray nozzle system causes little or no pressure on the mold walls whereas the jacketed system could burst the mold walls due to excess pressure if the outlet were to become clogged or restricted. In the described preferred embodiment of FIG. 1, if discharge drain 22 became clogged, oil would fill oil pan 12 causing mold flange 16 to rise, thereby freeing the trapped fluid which would overflow, preferably through an overflow pipe (not shown) provided for just such an emergency. Thus, no damage would be done to the mold or the temperature control apparatus.

The fluid medium used in the described system is preferably a non-flammable petroleum product such as diesel oil. However, other fluids can be employed if they retain satisfactory viscosity characteristics over the temperature range involved to be sprayed through the nozzles.

Three large containers or tanks are provided in which the oil is stored preparatory to spraying, and into which the oil is returned after spraying. These tanks are generally designated as preheat tank 28, curing tank 30 and cooling tank 32 in accordance with their temperature characteristics. It has been found that 160 gallon capacity tanks are a practical size. Preheat tank 28 and curing tank 30 are preferably entirely covered with insulation layer 34 or have an internal insulation sub-skin. The oil in tanks 28 and 30 can be heated by means of an internal bank of steam pipes 36 disposed within each tank for a large production operation. Electrically powered immersion heaters may be used for a small scale operation. Steam pipes 36 and 36a are supplied with high pressure live steam from a steam boiler not shown. A typical installation would have a main line 37 leading from the boiler, a T branch 39, motorized valves 41 and 41a operatively connected to hydrostatic thermostats 43 and 43a that are embedded in the tank walls and branch connected return lines 45 and 45a. In the described Gagnon process the thermostats 43 and 43a should be set to maintain preheat tank 28 at a specific temperature in the 225-300° F. range and curing tank 30 at a specific temperature in the 375-450° F. range.

Cooling tank 32 contains oil which is maintained at a temperature of approximately 100° F. This temperature is achieved by circulating the oil through a refrigerating system 38 which includes a housing 40, a coil of copper piping 42 (or other metal having good heat conductivity) leading to and from cooling tank 32, and a source of coolant 44, as for example a cold water tap, which feeds into container 40 through inlet line 46. The coolant 48 is continuously removed from housing 40 by gravity flow through outlet line 50. The oil from cooling tank 32 is pumped and circulated through the refrigerating system 38 by means of pump 52 and connecting pipes 54, 56 and 58. The coolant 48 provides a continuously changing fluid blanket which absorbs and dissipates the heat expelled by the oil through the copper piping walls 42. Ordinary tap water has been found to be a satisfactory coolant fluid.

It will be noted in FIG. 1 that preheat tank 28 and curing tank 30 are provided with recirculation systems to insure that the oil contained in the tanks is uniformly heated. The recirculation systems consist of pumps 60 and 62 and connecting lines 64, 66, 68 and 70 respectively. The purpose of the recirculation systems is to prevent the oil 48 lying adjacent the steam pipes 36 and 36a at the bottom of the tanks from becoming hotter than the oil nearer the top of the tanks. The recirculation systems operate continuously to prevent this.

In order to connect the tanks to the spray nozzles, spray lines 72, 74 and 76 are provided and are controlled respectively by valves 78, 80 and 82. Spray lines 72, 74 and 76 are branch connected at 84 and are joined to nozzle inlet line 26 via spray line 86. This completes the description of the oil supply system which extends from the tanks, through the pumps, through the lines to the valves and finally to the spray nozzles. To continuously discharge the accumulated oil after each spraying, pump 88 conveys the oil that has dropped through drain 22 along return line 90 past branch connection 92 to valves 94, 96 and 98. These valves respectively control the flow into return lines 100, 102 and 104 which empty into the three oil tanks.

Thus, it can be seen that each of the three tanks has a heating or cooling apparatus to maintain the oil at the desired temperature and a recirculation system to maintain a uniform temperature level therein. Furthermore, each tank has a pump which moves the oil into the spray lines which are controlled by valves that selectively direct the desired oil flow to the spray nozzles. An oil discharge pan is positioned to receive the sprayed oil which is then pumped through outlet valves back into the tanks.

*Operation*

The novel process herein described can be accomplished by one man or can be automated in varying degrees. In a one man operation, the operator initially preheats the mold by opening valves 80 and 96 so that oil from the preheat tank 28, which is maintained at approximately 250° F., is drawn from the preheat tank and pumped by pump 60 through connecting line 64 and spray lines 74 and 86 and is sprayed by nozzles 24 against the underside of the mold thereby uniformly heating the mold over its entire bottom and side wall surfaces. The sprayed oil falls back into oil discharge pan 12 and drains out through discharge drain 22 into return line 90 and is pumped by pump 88 through open valve 96 through return line 102 back into the preheat tank. The preheat oil spray is continued for a predetermined duration until the mold is heated to 250° F. after which time the preheat cycle terminates and valves 60 and 96 are closed, either manually or automatically. It will be noted that the oil in the other two tanks is continuously being circulated by the tank pumps and the recirculation lines.

After the mold has achieved the proper preheat level, the operator sprays or otherwise applies a non-expandable vinyl plastisol into the mold cavity and allows it to gel until it becomes 8 to 20 mils thick. This gelation occurs quite rapidly. The operator then applies a coating of expansible vinyl plastisol and allows it to similarly gel.

The operator then opens valves 62 and 98 to pump oil at a temperature of approximately 425° F. from the curing tank through connecting line 68 and spray lines 76 and 86 into spray nozzles 24 to bring the mold up to fusion temperature to unite the vinyl plastisol layers. The fusion operation generally takes approximately six to ten minutes depending upon a variety of factors not important here. It will be noted that the manner of operation by which the oil passes from the discharge pan 12 and returns to the curing tank is similar to that of the preheat cycle. Valves 62 and 98 are then closed.

After fusion is completed, valves 52 and 94 are opened to pump a cool oil spray against the bottom of the mold so that the vinyl shell can be stripped from the mold. The sprayed oil drains through the discharge drain 22 and is pumped through oil return lines 90 and 100 back to the cooling tank 32. The oil involved in this step absorbs a large quantity of heat from its contact with the mold bottom. This oil is rapidly recooled in refrigeration system 38 after its return to the cooling tank 32. Valves 52 and 94 are then closed.

In the next step of the Gagnon process the vinyl shell is then stripped from the mold preparatory to inserting it into a second mold which is structurally reinforced to withstand the forces created by the foaming of the urethane. The subject matter of the present invention is in no way related to this procedure involving the second mold because this mold has no requirement for being heated or cooled to various temperature levels.

The ranges of temperatures within which the oil is maintained in the various tanks are as follows:

|  | °F. |
|---|---|
| Preheat tank | 225 to 300 |
| Curing tank | 375 to 450 |
| Cooling tank | Below 125 |

It is very important that these temperatures be maintained within the tanks in order to prevent undesirable properties from being developed in the molded product. For example, the vinyl components used in the Gagnon process gel at approximately 250° F. If the mold is not heated to this temperature level, gelation will not occur with the result that the plastisols remain in a semi-liquid state and tend to drip and drain from the vertical portions of the mold. Conversely, if the mold is preheated to a temperature above 300° F., each plastisol coat not only gels, but begins curing so that the two plastisol layers do not flow together properly before being fused. This causes lumps and visual surface defects to appear.

The curing temperature range is approximately 375° to 450° F. This level must not be exceeded in order to prevent overcuring which causes thermal decomposition and chemical change. On the other hand, too low a temperature causes undercuring which produces a vinyl product which has a non-uniform composition that is lacking in tensile strength.

Obviously, many modifications and variations of the present invention are possible in light of the above teachings. Therefore, it is to be understood that the invention is not limited in its application to the details of the construction and arrangements of parts specifically described or illustrated, and that within the scope of the appended claims, it may be practiced otherwise than as specifically described or illustrated.

I claim:
1. In a process of forming a molded flexible skin from a vinyl plastisol in a thin-walled shell mold, the inside mold face of which has a design of the surface of the article to be produced and the walls of said shell mold being so thin as to be unable to resist any substantial differential pressure without distortion, the improvement comprising placing said shell mold on a discharge pan with said mold face facing upwardly and with said mold being so mounted thereon as to permit the free overflow of any fluid trapped in said discharge pan, maintaining three reservoirs of a liquid heat exchange medium, the first of said reservoirs being maintained at a cooling temperature of less than 125° F., the second at a gelling temperature in the range of 225–300° F., and the third at a curing temperature in the range of 375–450° F., preheating said shell mold to said gelling temperature by withdrawing liquid heat exchange medium from said second reservoir and spraying the same against the underside of said shell mold while collecting the liquid so sprayed in said discharge pan and returning the same to said second reservoir, applying and gelling a layer of heat gelable and curable vinyl plastisol to said shell mold while maintaining said shell mold at said gelling temperature by means of the spray, then heating said shell mold and the plastisol therein to said curing temperature by ceasing flow of the liquid heat exchange medium from said second reservoir and withdrawing liquid heat exchange medium from said third reservoir and spraying the same against the underside of said shell mold while collecting the liquid so sprayed in said discharge pan and returning the same to said third reservoir, thereafter rapidly cooling said shell mold by ceasing flow of the liquid heat exchange medium from said third reservoir and withdrawing liquid heat exchange medium from said first reservoir and spraying the same against the underside of said shell mold while collecting the liquid so sprayed in said discharge pan and returning the same to said first reservoir, and after said shell mold has been cooled to a temperature of less than 125° F. removing said vinyl skin from said shell mold, the pressure on the mold face and underside of said shell mold being substantially atmospheric through all steps of the process.

2. The process of claim 1 wherein said layer of vinyl plastisol consists of a first layer of a nonexpansible vinyl plastisol and a second layer therein of an expansible vinyl plastisol.

References Cited by the Examiner

UNITED STATES PATENTS

| 2,278,858 | 4/42 | Fields | 264—311 |
| 2,624,072 | 1/53 | Delacoste et al. | 264—310 |
| 2,629,131 | 2/53 | Martin et al. | 18—26 |
| 2,964,798 | 12/60 | Ferrell | 264—302 |

ALEXANDER H. BRODMERKEL, *Primary Examiner.*